United States Patent [19]

Lednicer et al.

[11] E Patent Number: Re. 33,589

[45] Reissued Date of Patent: May 14, 1991

[54] HELICOPTER BLADE AIRFOIL

[75] Inventors: David A. Lednicer; Stephen J. Owen, both of Redmond, Wash.

[73] Assignee: United Technologies Corporation, Hartford, Conn.

[21] Appl. No.: 526,251

[22] Filed: May 17, 1990

Related U.S. Patent Documents

Reissue of:

[64] Patent No.: 4,744,728
Issued: May 17, 1988
Appl. No.: 903,169
Filed: Sep. 3, 1986

[51] Int. Cl.[5] ..... B64C 27/46

[52] U.S. Cl. ..... 416/223 R; 416/242

[58] Field of Search ..... 416/223 R, 228, 144, 416/226, 242, DIG. 2; 244/35 R

[56] References Cited

U.S. PATENT DOCUMENTS

| | | | |
|---|---|---|---|
| 3,728,045 | 4/1973 | Balch | 416/223 |
| 4,142,837 | 3/1979 | de Simone | 416/223 |
| 4,248,572 | 2/1981 | Fredenburgh | 416/228 |
| 4,314,795 | 2/1982 | Dadone | 416/223 |
| 4,412,664 | 11/1983 | Noonan | 244/35 R |
| 4,459,083 | 7/1984 | Bingham | 416/223 |
| 4,567,337 | 1/1986 | Zimmer et al. | 416/223 |
| 4,569,633 | 2/1986 | Flemming, Jr. et al. | 416/228 |
| 4,652,213 | 3/1987 | Thibert | 416/223 |

FOREIGN PATENT DOCUMENTS

| | | |
|---|---|---|
| 2059373 | 9/1979 | United Kingdom . |
| 2138374 | 10/1984 | United Kingdom . |

*Primary Examiner*—John T. Kwon
*Attorney, Agent, or Firm*—Troxell K. Snyder

[57] ABSTRACT

A family of airfoil cross sections, termed SC21xx, for use in a helicopter blade is disclosed. The airfoil (36) achieves maximum lift performance equivalent to prior art airfoil configurations without incurring increased aerodynamic drag at high velocities. The airfoil (36) was developed by thickening and drooping the leading edge region (38) of the prior art airfoil (30) improving lift in the leading edge region (38) and delaying the formation of sonic shock waves at high velocities.

5 Claims, 3 Drawing Sheets

HELICOPTER BLADE AIRFOIL

Matter enclosed in heavy brackets [ ] appears in the original patent but forms no part of this reissue specification; matter printed in italics indicates the additions made by reissue.

*This application is a reissue of 06/903,169, U.S. Pat. No. 4,744,728, now surrendered.*

FIELD OF THE INVENTION

The present invention relates to a blade for a helicopter, and more particularly, to the airfoil cross section thereof.

BACKGROUND

Rotorcraft, such as helicopters, are supported vertically by a plurality of driven blades which rotate about a vertical axis. It will be appreciated that, since both the lift and propulsive force of the helicopter are supplied primarily through the large rotating blade system, it is advantageous to provide a main blade configuration which achieves a high lifting force at a given airspeed and which does not experience a high aerodynamic drag.

The prior art contains many examples of blades and airfoils attempting to achieve this high lift-low drag performance ideal, most notably U.S. Pat. No. 3,728,045 issued Apr. 17, 1973 to Balch, U.S. Pat. No. 4,142,837 issued Mar. 6, 1979 to de Simone and U.S. Pat. No. 4,569,633 issued Feb. 11, 1986 to Flemming, Jr.

The Balch airfoil, designated SC1095, provides an airfoil cross section which achieves both higher maximum lift and lower zero lift aerodynamic drag at high velocity conditions as compared to the then-existing airfoils. These improvements were realized by selectively shaping the airfoil surface for both higher lift and lower drag by delaying separation of the airflow boundary layer over the airfoil, as well as decreasing the local Mach number at high freestream velocities.

The de Simone airfoil, also referred to as the SC1095-R8 configuration, is characterized in the referenced patent as an improvement over the SC1095 airfoil wherein the airfoil upper surface is shaped to distribute the surface static pressure peak over a greater area thereby reducing the likelihood of airfoil boundary layer separation. The SC1095-R8 airfoil achieves higher maximum lift than the SC1095 configuration at lower velocities, but is subject to higher zero lift drag forces at high velocity conditions.

The Flemming, Jr. configuration is an improvement over the SC1095-R8 design and is particularly well adapted for use in high speed applications, such as in the radially outer tip portion of the main blade. The Flemming, Jr. airfoil, also termed the SSC-Axx family, further reduces the zero lift drag force at high air speeds by delaying the creation of shock waves in the local airflow. This further reduction in aerodynamic drag at high air speed is achieved at the expense of some maximum lift at lower velocity operation.

As will be apparent from considering the above mentioned references as a group, prior art blade designers combine several types of airfoil cross sections along the span of an individual blade in an attempt to maximize the lift and minimize the drag over the range of expected airflow velocities. For example, U.S. Pat. No. 4,248,572 issued Feb. 3, 1981 to Fradenburgh shows a single helicopter blade which utilizes the high lift SC1095-R8 airfoil configuration in the lower velocity central span region of the blade and the lower lift SC1095 airfoil section radially outward thereof in that portion of the blade which encounters higher air velocities. The Flemming, Jr. patent provides a still further modification wherein members of the SSC-Axx family of airfoils is used in the rotor tip portion due to its still greater resistance to shock wave formation at high airflow velocities.

As can be seen, the twin goals of high lift and low drag in prior art airfoils are exclusionary, leading designers to specify high lift airfoil configurations only in the lower speed regions of the rotorcraft blade while being content with reduced lift in the radially outer high speed portions in order to avoid excessive aerodynamic drag. What is needed is an airfoil configuration able to produce high lift without experiencing unacceptably high drag force under high airflow velocity operation.

SUMMARY OF THE INVENTION

It is therefore an object of the present invention to provided a blade for a rotorcraft which exhibits improved performance in the form of reduced aerodynamic drag while maintaining the maximum lift available in prior art blades.

It is further an object of the present invention to provide an improved rotor airfoil cross section configured to delay the onset of aerodynamic drag divergence as the airfoil is subjected to increasing velocity airflow over the blade exterior.

It is further an object of the present invention to provide an improved rotor airfoil cross section which experiences a reduced quarter-chord pitching moment as compared to prior art high lift, low drag configurations, thereby reducing torsional stress within the blade.

It is further an object of the present invention to provide an improved rotor airfoil cross section which is suited for use in the region of the helicopter blade span extending from the rotor hub to a point approximately 90% of the distance to the blade tip.

It is still further an object of the present invention to provide a family of similar shaped airfoil cross sections of differing thicknesses for use along the blade span.

The present invention provides an improved airfoil cross section for use in a rotating helicopter blade or the like and which experiences reduced zero lift aerodynamic drag as compared to prior art airfoil configurations without incurring a penalty in the form of reduced maximum lift. Improved performance is accomplished by altering the leading edge and surface geometry of a prior art, low drag airfoil configuration to increase the maximum lift coefficient without significantly changing the drag coefficient or pitching moment about the quarter chord point.

More specifically, the forward portion of a prior art SSC-Axx family blade airfoil, the SSC-A10, is thickened and "drooped" slightly, improving the blade lift coefficient. The result is a high lift, low drag airfoil design which obtains the best advantages of prior art designs with a single configuration. The performance of the airfoil section according to the present invention over the range of operating conditions is such that the same family of airfoil shapes may be used along nearly the entire helicopter rotor blade span, preferably in that portion of the span extending from the rotor hub to 90% of the span distance between the hub and the blade tip.

A rotorcraft equipped with a rotor blade having an airfoil cross section according to the present invention requires less power to drive the main rotor, especially during periods of high speed horizontal flight in which the advancing rotor blades are subject to high relative velocity airflows.

Additionally, by providing a reduced quarter-chord pitching moment as compared to prior art high lift blade airfoils, blades utilizing airfoils according to the present invention are subject to less torsional stress along the blade span thereby exhibiting less twisting between the hub and tip sections. Both these and other advantages and features will be apparent to those skilled in the art upon close review of the following specification and the appended claims and drawing figures.

BRIEF DESCRIPTION OF THE DRAWINGS

FIG. 1 shows a schematic view of a rotating blade for a rotorcraft or the like.

BEST MODE FOR CARRYING OUT THE INVENTION

Figure 1:
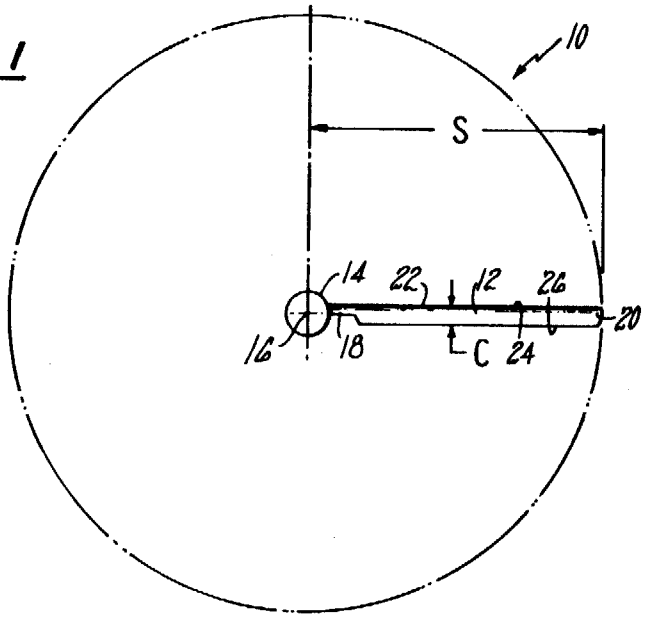

FIG. 1 shows a schematic of a helicopter rotor 10 which consists of a plurality of equally spaced blades 12 mounted for rotation with a rotor hub 14 about an axis of rotation 16. Each blade 12 is preferably identical to the single blade illustrated in FIG. 1 and includes a root portion 18 which connects to the hub 14, a tip portion 20 which is that part of the blade farthest from the axis of rotation 16 and which therefore travels at the highest speed, and a center portion 22 extending between the hub 14 and tip 20. Each of the blades 12 has a leading edge 24, a trailing edge 26 and defines a chord dimension C and a span dimension S as shown in FIG. 1. The blade 12 is an airfoil in cross section and generates lift during rotation of the blade 12.

Figure 2:
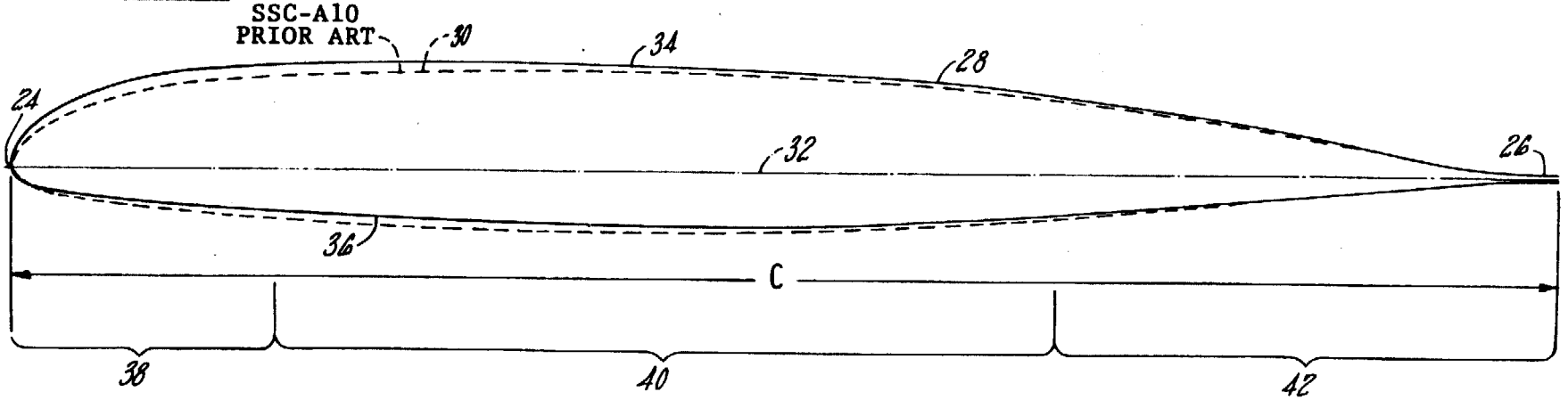
FIG. 2 shows a cross section of the airfoil according to the present invention and a prior art SSC-A10 airfoil cross section.

Turning now to FIG. 2, a cross section 28 of the airfoil according to the present invention is shown overlain with a cross section 30 of a prior art SSC-A10 airfoil. The airfoil according to the present invention, also termed "SC2110", is shown with the leading edge 24 and trailing edge 26 defining a chordal distance C therebetween. FIG. 2 also shows the airfoil chord line 30 connecting the leading and trailing edges 24, 26. The airfoil section 28 includes an upper surface 34 and a lower surface 36 disposed on opposite sides of the chord line 32.

It is conventional to define an individual airfoil shape by setting forth the location of the upper airfoil surface 34 and the lower airfoil surface 36 at a plurality of stations disposed along the blade chord 32. The SC2110 airfoil cross section 28 according to the present invention is defined in Table I which contains a listing of the vertical displacement $Y_u$, $Y_l$ of the airfoil upper and lower surfaces 34, 36 as a fraction of the airfoil chordal dimension C. The horizontal displacement of each station is represented by the column titled X/C and represents the proportional displacement along the airfoil chord line 32 from the leading edge 24 to the trailing edge 26.

TABLE I

| X/C | $Y_{u/c}$ | $Y_{l/c}$ |
|---|---|---|
| 0.0 | 0.0 | 0.0 |
| 0.004179 | 0.012216 | −0.007622 |
| 0.006589 | 0.015843 | −0.008855 |
| 0.011469 | 0.021681 | −0.010655 |
| 0.023818 | 0.032107 | −0.013265 |
| 0.048677 | 0.044925 | −0.016700 |
| 0.073637 | 0.052653 | −0.019156 |
| 0.098647 | 0.057671 | −0.021112 |
| 0.148716 | 0.063313 | −0.024060 |
| 0.198856 | 0.065816 | −0.026699 |
| 0.249026 | 0.066705 | −0.029199 |
| 0.299206 | 0.066734 | −0.031285 |
| 0.337529 | 0.066424 | −0.032514 |
| 0.377406 | 0.065877 | −0.033372 |
| 0.417281 | 0.065058 | −0.033801 |
| 0.437217 | 0.064511 | −0.033848 |
| 0.457152 | 0.063848 | −0.033784 |
| 0.477085 | 0.063055 | −0.033605 |
| 0.497018 | 0.062135 | −0.033304 |
| 0.536880 | 0.059927 | −0.032343 |
| 0.556810 | 0.058641 | −0.031680 |
| 0.576739 | 0.057228 | −0.030903 |
| 0.596668 | 0.055676 | −0.030019 |
| 0.636519 | 0.052112 | −0.027955 |
| 0.656445 | 0.050076 | −0.026779 |
| 0.676366 | 0.047861 | −0.025512 |
| 0.696288 | 0.045461 | −0.024157 |
| 0.736125 | 0.040116 | −0.021213 |
| 0.756042 | 0.037186 | −0.011641 |
| 0.775956 | 0.034105 | −0.018017 |
| 0.795871 | 0.030894 | −0.016351 |
| 0.835698 | 0.024166 | −0.012929 |
| 0.855611 | 0.020691 | −0.011180 |
| 0.875522 | 0.017178 | −0.009404 |
| 0.895435 | 0.013670 | −0.007600 |
| 0.935263 | 0.007073 | −0.004043 |
| 0.955180 | 0.004381 | −0.002452 |
| 0.975106 | 0.002582 | −0.001260 |
| 0.985074 | 0.002218 | −0.000912 |
| 0.995045 | 0.002365 | −0.000821 |
| 1.000000 | 0.002676 | −0.000899 |

As with the SSC-A10 airfoil, the SC2110 airfoil is a member of a corresponding family of similar shapes of differing thicknesses as defined by the ratio of airfoil maximum thickness ($t_{max}$) to airfoil chord (C). The airfoil designations SSC-A10 and SC2110 thus each represent individual members of the respective airfoil families SSC-Axx and SC21xx wherein the ratio of $t_{max}$ to C is approximately 0.10, or 10%. The SC21xx family of airfoils is defined by Table II wherein the vertical displacement of the upper and lower airfoil surfaces is tabulated at a plurality of stations along the airfoil chord 32, each station defined as in Table I as a proportional displacement X/C of the distance between the blade leading and trailing edges 24, 26. Vertical displacements are expressed as a ratio of the vertical displacement $Y_u$, $Y_l$, to the blade maximum thickness, $t_{max}$.

TABLE II

| X/C | $Y_u/t_{max}$ | $Y_l/t_{max}$ |
|---|---|---|
| 0.000000 | 0.000000 | 0.000000 |
| 0.004179 | 0.123145 | −0.076835 |
| 0.006589 | 0.159708 | −0.089264 |
| 0.011469 | 0.218559 | −0.107409 |
| 0.023818 | 0.323659 | −0.133720 |

TABLE II-continued

| X/C | $Y_u/t_{max}$ | $Y_l/t_{max}$ |
|---|---|---|
| 0.048677 | 0.452873 | −0.168347 |
| 0.073637 | 0.530776 | −0.193105 |
| 0.098647 | 0.581361 | −0.212823 |
| 0.148716 | 0.638236 | −0.242540 |
| 0.198856 | 0.663468 | −0.269143 |
| 0.249026 | 0.672430 | −0.294345 |
| 0.299206 | 0.672722 | −0.315373 |
| 0.337529 | 0.669597 | −0.327762 |
| 0.377406 | 0.664083 | −0.336411 |
| 0.417281 | 0.655827 | −0.340736 |
| 0.437217 | 0.650313 | −0.341210 |
| 0.457152 | 0.643629 | −0.340565 |
| 0.477085 | 0.635635 | −0.338760 |
| 0.497018 | 0.626361 | −0.335726 |
| 0.536880 | 0.604103 | −0.326038 |
| 0.556810 | 0.591139 | −0.319355 |
| 0.576739 | 0.576895 | −0.311522 |
| 0.596668 | 0.561250 | −0.302611 |
| 0.636519 | 0.525323 | −0.281805 |
| 0.656445 | 0.504799 | −0.269950 |
| 0.676366 | 0.482470 | −0.257178 |
| 0.696288 | 0.458276 | −0.243518 |
| 0.736125 | 0.404395 | −0.213841 |
| 0.756042 | 0.374859 | −0.117349 |
| 0.775956 | 0.343801 | −0.181623 |
| 0.795871 | 0.311432 | −0.164829 |
| 0.835698 | 0.243609 | −0.130333 |
| 0.855611 | 0.208579 | −0.112702 |
| 0.875522 | 0.173165 | −0.094798 |
| 0.895435 | 0.137802 | −0.076613 |
| 0.935263 | 0.071300 | −0.040756 |
| 0.955180 | 0.044163 | −0.024718 |
| 0.975106 | 0.026028 | −0.012702 |
| 0.985074 | 0.022359 | −0.009194 |
| 0.995045 | 0.023841 | −0.008276 |
| 1.000000 | 0.026976 | −0.009063 |

It has been determined that the advantages of increased performance are still achieved by the SC21xx airfoils generally, and the SC2110 airfoil particularly, it the tabulated quantities vary throughout a rang of ± three percent.

The airfoil section 28 according to the present invention is a derivative of the SSC-A10 cross section 30 and differs therefrom both in configuration and in performance. The SC2110 cross section 28 is significantly thicker than the prior art airfoil section 30 in the leading edge region 38 and the central chord region 40, while being substantially similar in thickness in the trailing edge region 42. The leading edge, central chord, and trailing edge regions 38, 40, 42, are as defined in U.S. Pat. No. 4,569,633 issued to Flemming, Jr., discussed in the Background section hereinabove.

It should further be noted that this increased thickness is accompanied by an increased camber or "droop" in the forward portions 38, 40 of the airfoil cross section, resulting in the upper surface 34 of the SC2110 cross section 28 being located at a greater vertical displacement from the airfoil chord line 32 as compared to the corresponding surface on the prior art SSC-A10 cross section 30. This droop is most accurately expressed as rotation of the prior art SSC-A10 nose of about 3.25° about the X/C=0.15 chord station.

The drooped configuration of the present invention provides additional lift over the prior art SSC-A10 airfoil 30, restoring lift performance nearly to that of the SC1095-R8 configuration as discussed in the Background section. The reshaped cross section also evens out the variation of local air velocity and Mach number over the forward surface of the airfoil 30, thereby delaying the formation of sonic shock waves.

Figure 3:
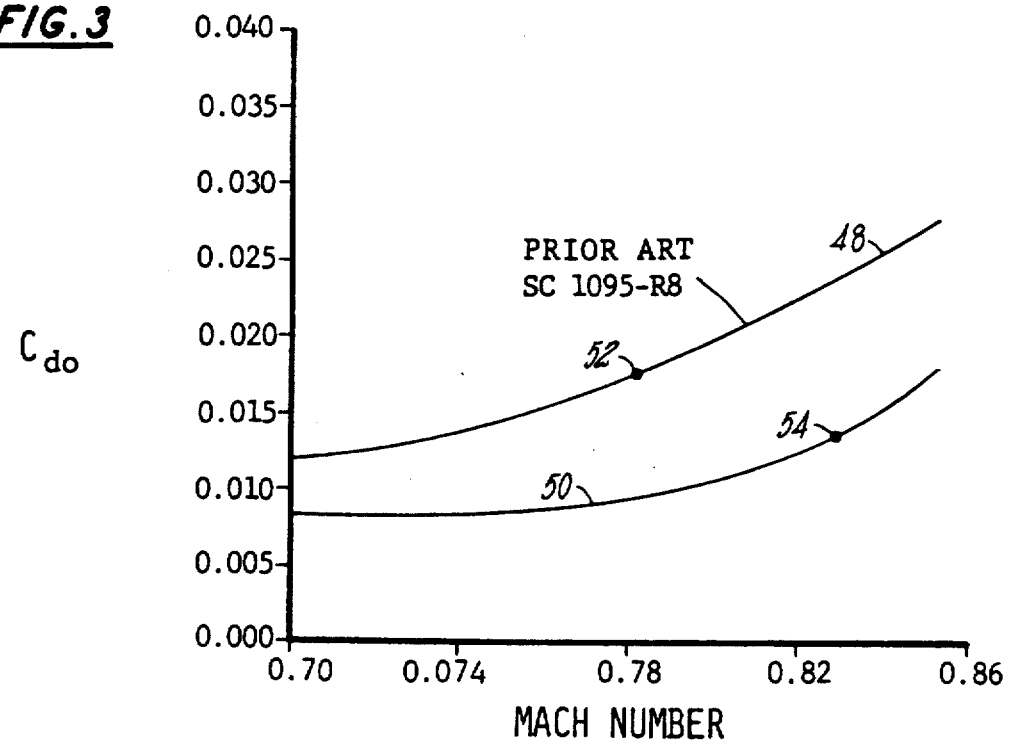
FIG. 3 is a graphical representation of the relationship between the coefficient of zero lift aerodynamic drag and the Mach number for airfoils according to the present invention and a prior art SC1095-R8 airfoil.
Figure 4:
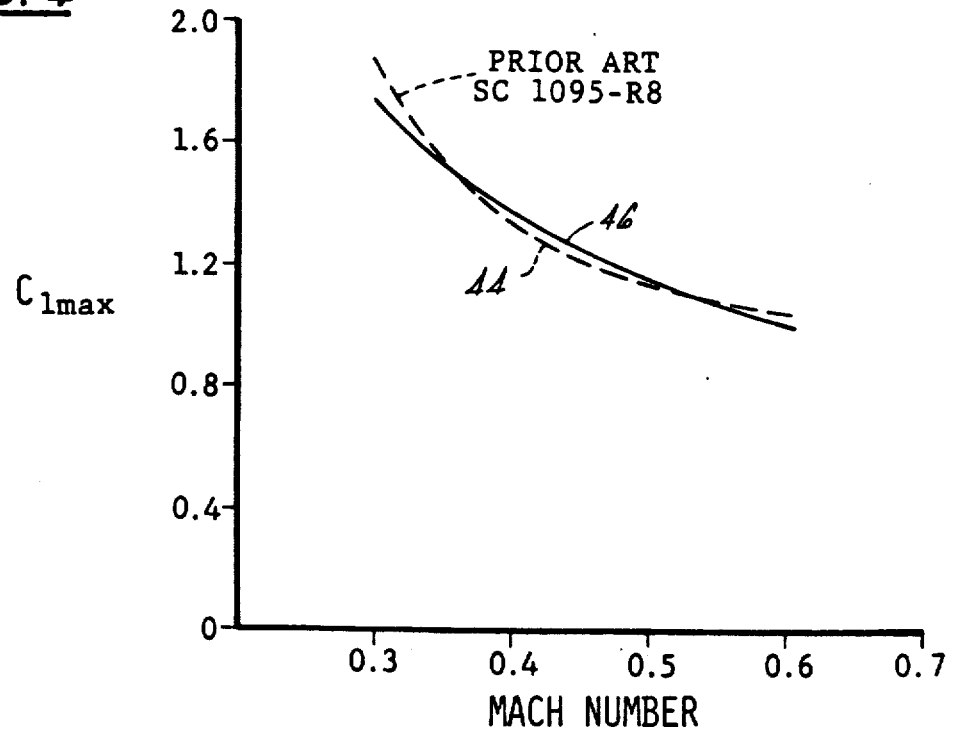
FIG. 4 is a graphical representation of the relationship between the maximum aerodynamic lift coefficient and Mach number for the airfoil according to the present invention and a prior art SC1095-R8 airfoil.

The success of the SC2110 airfoil section 28 is evident from FIGS. 3 and 4 which compare the lift and drag coefficients of individual blades over a range of Mach numbers. FIG. 4 shows the coefficient of maximum lift, $C_{lmax}$, for a prior art SC1095-R8 airfoil 44 to a similar curve 46 representing the performance of a blade utilizing an airfoil according to the present invention. The two curves 44, 46 are nearly identical over the range of Mach numbers 0.3 to 0.6 indicating that lift performance of the SC2110 is comparable to the SC1095-R8 airfoil. The SC1095-R8 airfoil has been selected for the comparison of FIGS. 3 and 4 as it is the highest lift rotorcraft airfoil configuration known in the prior art.

FIG. 3 clearly shows the greatest single advantage of the airfoil according to the present invention over the prior art SC1095-R8 high lift airfoil. FIG. 3 is a plot of the drag coefficient of individual blades at the zero lift orientation, $C_{do}$, over the range of Mach numbers 0.7 to 0.86. The curve of the prior art SC1095-R8 airfoil 48 lies well above the curve 50 which represents the performance of the airfoil according to the present invention. By comparing FIGS. 3 and 4, it should be readily apparent that a blade utilizing an airfoil according to the present invention provides lifting performance substantially equivalent to that of the best rotorcraft airfoil sections heretofore known in the art while simultaneously inducing less drag in the upper Mach number operating range.

More significantly, the airfoil of the present invention can operate at a significantly higher Mach number before reaching the drag divergence air speed limit above which aerodynamic drag increases rapidly and unacceptably. The drag divergence is defined as the air speed at which the ratio of the change of the zero lift drag coefficient to the change of Mach number reaches a value of 0.1. These points are shown in FIG. 3 for the prior art airfoil 52 and the airfoil according to the present invention 54 illustrating the advantage of the SC2110 airfoil over the prior art high lift airfoils at high Mach number operation.

Figure 5:
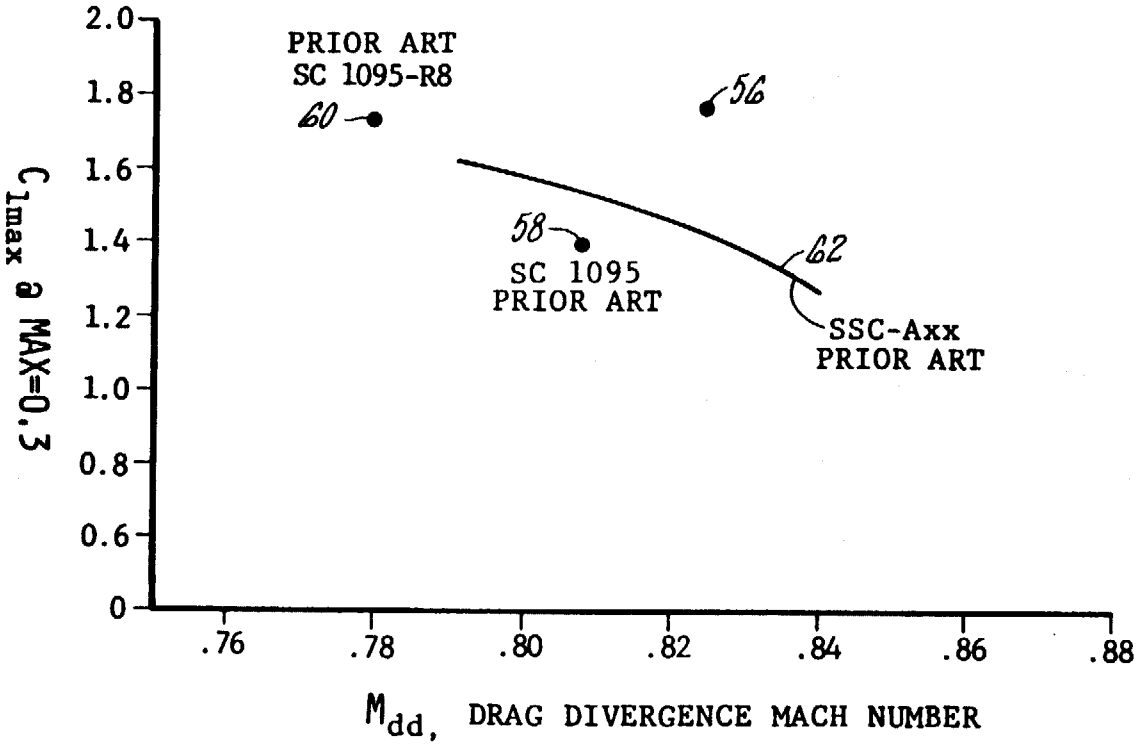
FIG. 5 is a graphical comparison of the maximum lift coefficient and drag divergence number for an airfoil according to the present invention and a series of prior art airfoils.

FIG. 5 presents a comparison of the lift and drag performance of the SC2110 airfoil with that of its predecessor configurations. FIG. 5 is a plot of each airfoil section wherein the vertical displacement represents the maximum lift coefficient at a relatively low Mach number, M=0.3, and the horizontal displacement is equivalent to the drag divergence Mach number ($M_{dd}$). As will be appreciated by those skilled in the art, the point 56 representing the airfoil according to the present invention has pushed the operating envelope for rotorcraft blades significantly toward the upper right hand corner as compared to the performance of the prior art SC1095, SC1095-R8 and SSC-Axx family airfoils 58, 60, 62, signifying an airfoil section which will achieve high lift force over nearly the entire blade airspeed operating range.

The broad operating range of the airfoil according to the present invention allows a blade 12 to utilize an individual airfoil section over nearly the entire span of the blade, unlike prior art blades wherein airfoil sections had to be matched with expected Mach number in order to avoid undue drag and undesirably high power consumption. The airfoil according to the present invention is thus able to be used over that portion of the blade span extending from the central hub 14 to nearly 90% of the span length toward the blade tip 20, providing the high maximum lift characteristics of the SC1095-R8 configuration without experiencing the drag divergence phenomenon inherent in the prior art airfoil shapes.

The remaining outer 10% of the blade span may utilize a prior art SSC-Axx airfoil or other configuration best suited for the high speed tip region wherein the generation of lift is of secondary importance as compared to actual drag.

It is thus apparent that the airfoil cross section 28 according to the present invention is well suited to achieve the objects and advantages as set forth hereinabove, and it will further be appreciated by those skilled in the art that various minor modifications may be made from the configuration as presented without departing from the spirit and scope of the invention as described and claimed.

We claim:

1. A blade for a rotorcraft having a first root end mounted to a central hub, a second tip end, and a span extending between the root and tip ends, the blade further including a high lift, low drag airfoil cross section having a leading edge and a trailing edge, an upper airfoil surface and a lower airfoil surface, each surface extending between the leading and trailing edges and characterized by the tabulation:

| X/C | $Y_{u/c}$ | $Y_{l/e}$ |
|---|---|---|
| 0.0 | 0.0 | 0.0 |
| 0.004179 | 0.012216 | −0.007622 |
| 0.006589 | 0.015843 | −0.008855 |
| 0.011469 | 0.021681 | −0.010655 |
| 0.023818 | 0.032107 | −0.013265 |
| 0.048677 | 0.044925 | −0.016700 |
| 0.073637 | 0.052653 | −0.019156 |
| 0.098647 | 0.057671 | −0.021112 |
| 0.148716 | 0.063313 | −0.024060 |
| 0.198856 | 0.065816 | −0.026699 |
| 0.249026 | 0.066705 | −0.029199 |
| 0.299206 | 0.066734 | −0.031285 |
| 0.337529 | 0.066424 | −0.032514 |
| 0.377406 | 0.065877 | −0.033372 |
| 0.417281 | 0.065058 | −0.033801 |
| 0.437217 | 0.064511 | −0.033848 |
| 0.457152 | 0.063848 | −0.033784 |
| 0.477085 | 0.063055 | −0.033605 |
| 0.497018 | 0.062135 | −0.033304 |
| 0.536880 | 0.059927 | −0.032343 |
| 0.556810 | 0.058641 | −0.031680 |
| 0.576739 | 0.057228 | −0.030903 |
| 0.596668 | 0.055676 | −0.030019 |
| 0.636519 | 0.052112 | −0.027955 |
| 0.656445 | 0.050076 | −0.026779 |
| 0.676366 | 0.047861 | −0.025512 |
| 0.696288 | 0.045461 | −0.024157 |
| 0.736125 | 0.040116 | −0.021213 |
| 0.756042 | 0.037186 | −0.011641 |
| 0.775956 | 0.034105 | −0.018017 |
| 0.795871 | 0.030894 | −0.016351 |
| 0.835698 | 0.024166 | −0.012929 |
| 0.855611 | 0.020691 | −0.011180 |
| 0.875522 | 0.017178 | −0.009404 |
| 0.895435 | 0.013670 | −0.007600 |
| 0.935263 | 0.007073 | −0.004043 |
| 0.955180 | 0.004381 | −0.002462 |
| 0.975106 | 0.002582 | −0.001260 |
| 0.985074 | 0.002218 | −0.000912 |
| 0.995045 | 0.002365 | −0.000821 |
| 1.000000 | 0.002676 | −0.000899 |

wherein

X is the linear displacement along a chord line extending between the airfoil leading edge and the airfoil trailing edge;

C is the chordal length of the airfoil cross section measured between the leading and the trailing edges;

$Y_u$ is the transverse displacement of the airfoil upper surface from the chord line; and $Y_l$ is the transverse displacement of the airfoil lower surface from the chord line.

2. The rotorcraft blade as recited in claim 1, wherein the high lift-low drag airfoil section is defined within that portion of the blade extending spanwisely from the root end to at least 90% of the distance to the tip end.

3. The rotorcraft blade as recited in claim 1, wherein the values of $Y_{l/C}$ and $Y_{u/C}$ are within 3% of the tabulated values.

4. A family of airfoil cross sections for a helicopter blade each having a leading edge and a trailing edge, an upper airfoil surface and a lower airfoil surface, each surface extending between the leading and trailing edges and characterized by the tabulation:

| X/C | $Y_u/t_{max}$ | $Y_l/t_{max}$ |
|---|---|---|
| 0.000000 | 0.000000 | 0.000000 |
| 0.004179 | 0.123145 | −0.076835 |
| 0.006589 | 0.159708 | −0.089264 |
| 0.011469 | 0.218559 | −0.107409 |
| 0.023818 | 0.323659 | −0.133720 |
| 0.048677 | 0.452873 | −0.168347 |
| 0.073637 | 0.530776 | −0.193105 |
| 0.098647 | 0.581361 | −0.212823 |
| 0.148716 | 0.638236 | −0.242540 |
| 0.198856 | 0.663468 | −0.269143 |
| 0.249026 | 0.672430 | −0.294345 |
| 0.299206 | 0.672722 | −0.315373 |
| 0.337529 | 0.669597 | −0.327762 |
| 0.377406 | 0.664083 | −0.336411 |
| 0.417281 | 0.655827 | −0.340736 |
| 0.437217 | 0.650313 | −0.341210 |
| 0.457152 | 0.643629 | −0.340565 |
| 0.477085 | 0.635635 | −0.338760 |
| 0.497018 | 0.626361 | −0.335726 |
| 0.536880 | 0.604103 | −0.326038 |
| 0.556810 | 0.591139 | −0.319355 |
| 0.576739 | 0.576895 | −0.311522 |
| 0.596668 | 0.561250 | −0.302611 |
| 0.636519 | 0.525323 | −0.281805 |
| 0.656445 | 0.504799 | −0.269950 |
| 0.676366 | 0.482470 | −0.257178 |
| 0.696288 | 0.458276 | −0.243518 |
| 0.736125 | 0.404395 | −0.213841 |
| 0.756042 | 0.374859 | −0.117349 |
| 0.775956 | 0.343801 | −0.181623 |
| 0.795871 | 0.311432 | −0.164829 |
| 0.835698 | 0.243609 | −0.130333 |
| 0.855611 | 0.208579 | −0.112702 |
| 0.875522 | 0.173165 | −0.094798 |
| 0.895435 | 0.137802 | −0.076613 |
| 0.935263 | 0.071300 | −0.040756 |
| 0.955180 | 0.044163 | −0.024718 |
| 0.975106 | 0.026028 | −0.012702 |
| 0.985074 | 0.022359 | −0.009194 |
| 0.995045 | 0.023841 | −0.008276 |
| 1.000000 | 0.026976 | −0.009063 |

wherein

X is the linear displacement along a chord line extending between the airfoil leading edge and the airfoil trailing edge;

C is the chordal length of the airfoil cross section measured between the leading and trailing edges;

$Y_u$ is the transverse displacement of the airfoil upper surface from the chord line;

$Y_l$ is the transverse displacement of the airfoil lower surface from the chord line; and $t_{max}$ is the maximum transverse thickness achieved by the airfoil cross section.

5. The family of airfoil cross sections as recited in claim 4, wherein the values of $Y_u/t_{max}$ and $Y_l/t_{max}$ are within 3% of the tabulated values.

* * * * *